April 18, 1950 N. S. McEWEN 2,504,437
SKEET TRAP
Filed Nov. 18, 1946 6 Sheets-Sheet 5
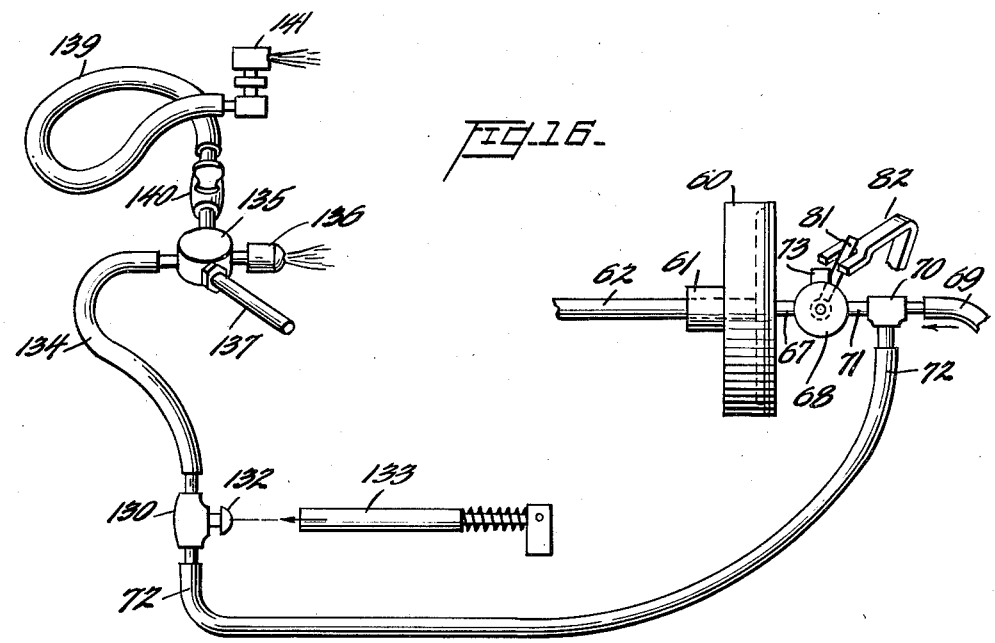
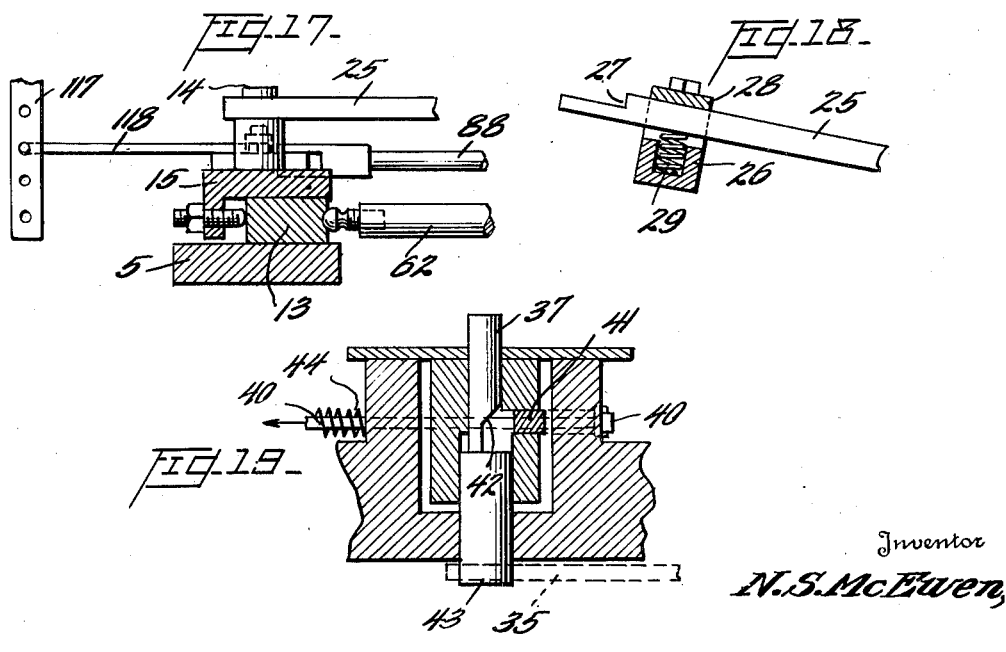
Inventor
N. S. McEwen,
By
Attorney April 18, 1950  N. S. McEWEN  2,504,437
SKEET TRAP
Filed Nov. 18, 1946  6 Sheets-Sheet 6
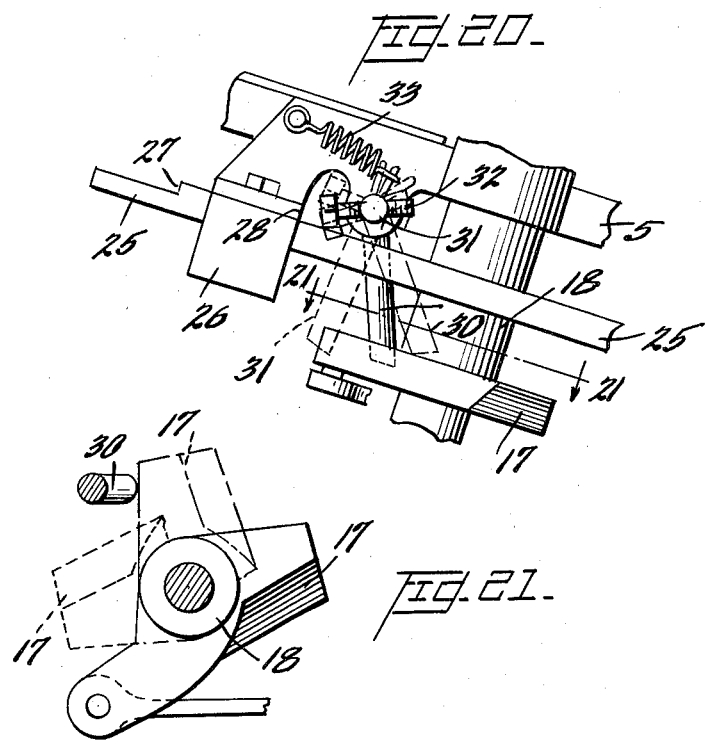
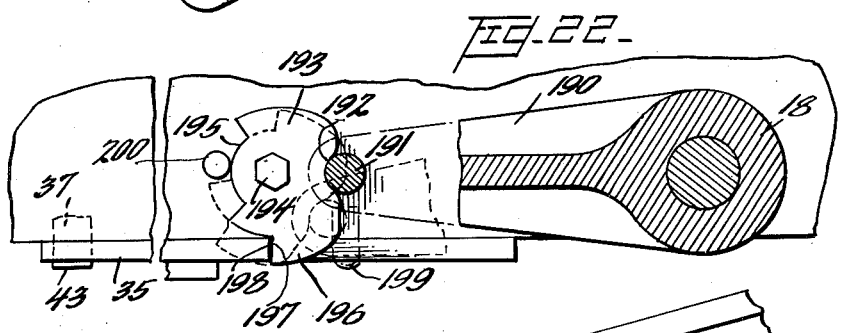
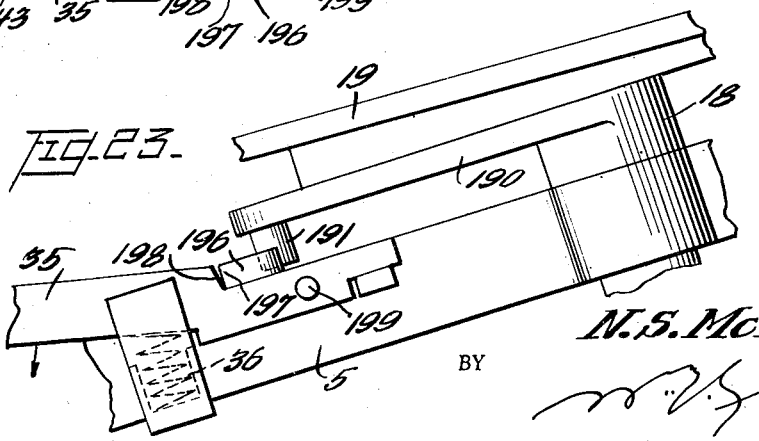
INVENTOR
N. S. McEwen,
BY
ATTORNEY Patented Apr. 18, 1950

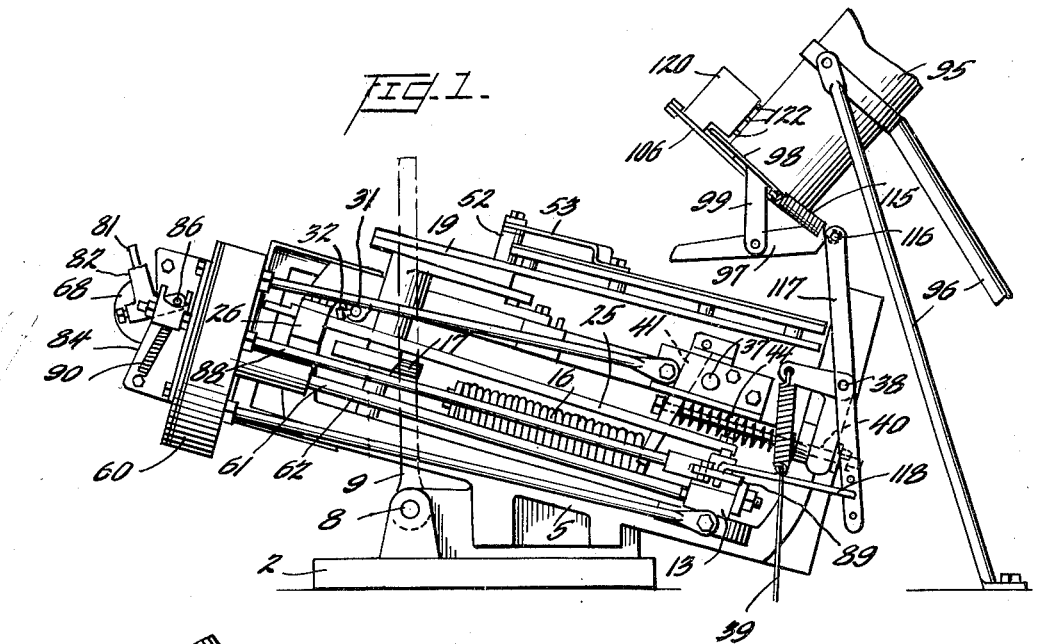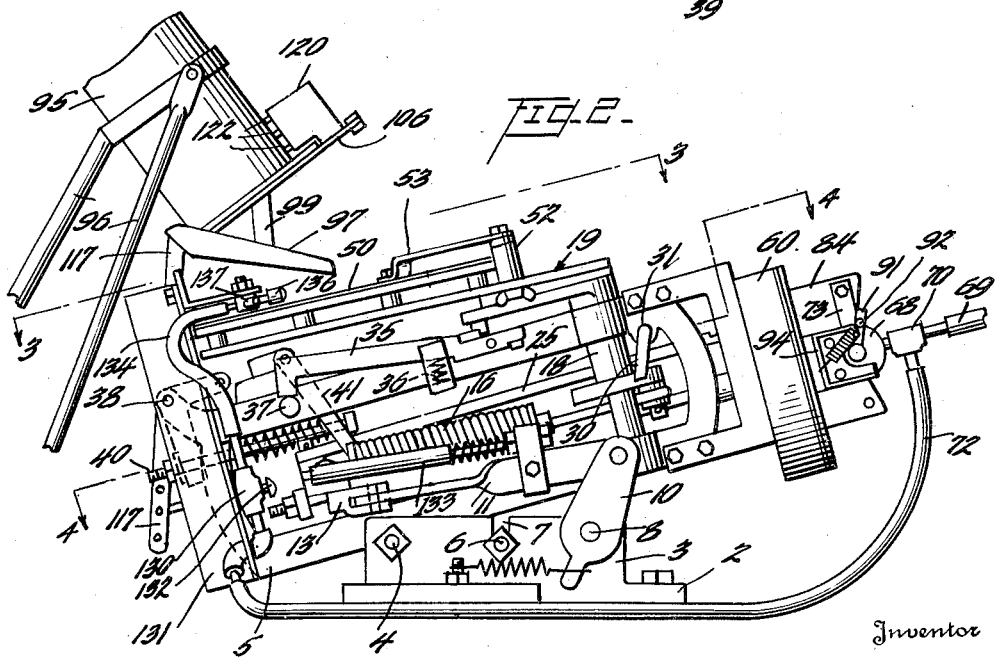

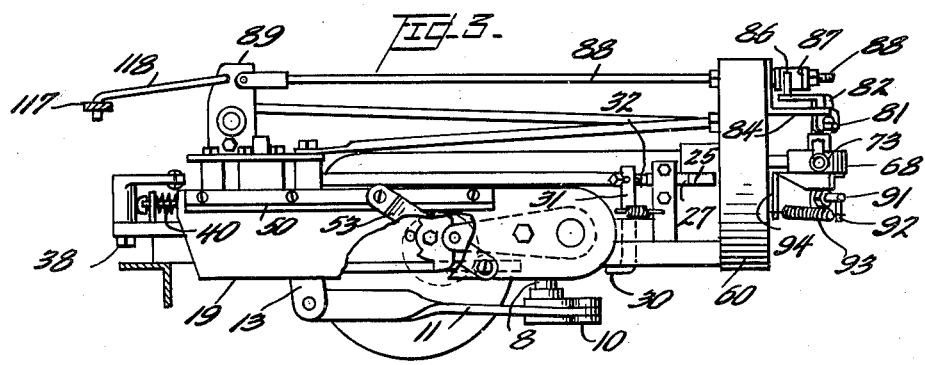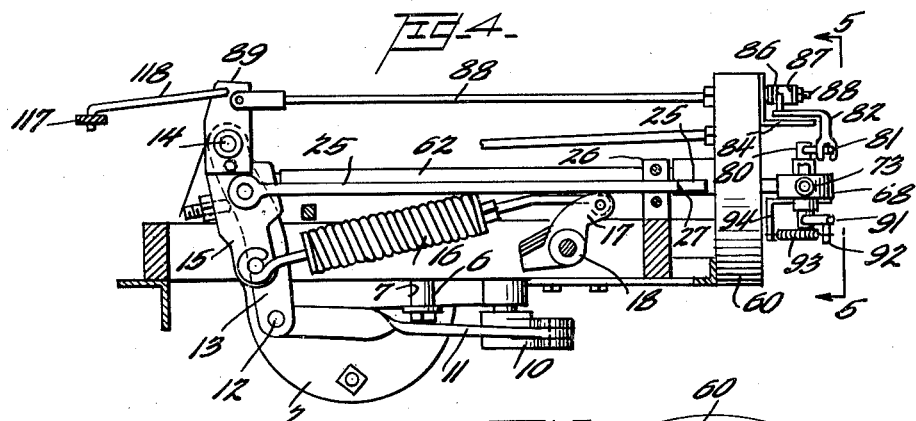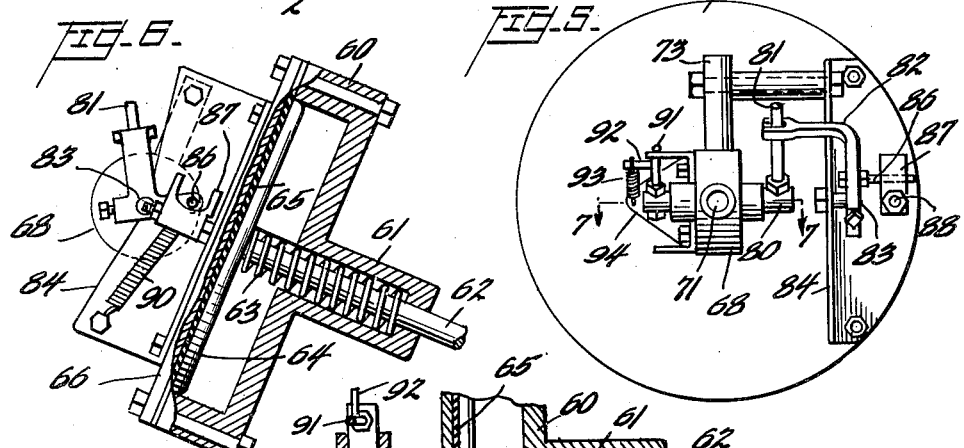

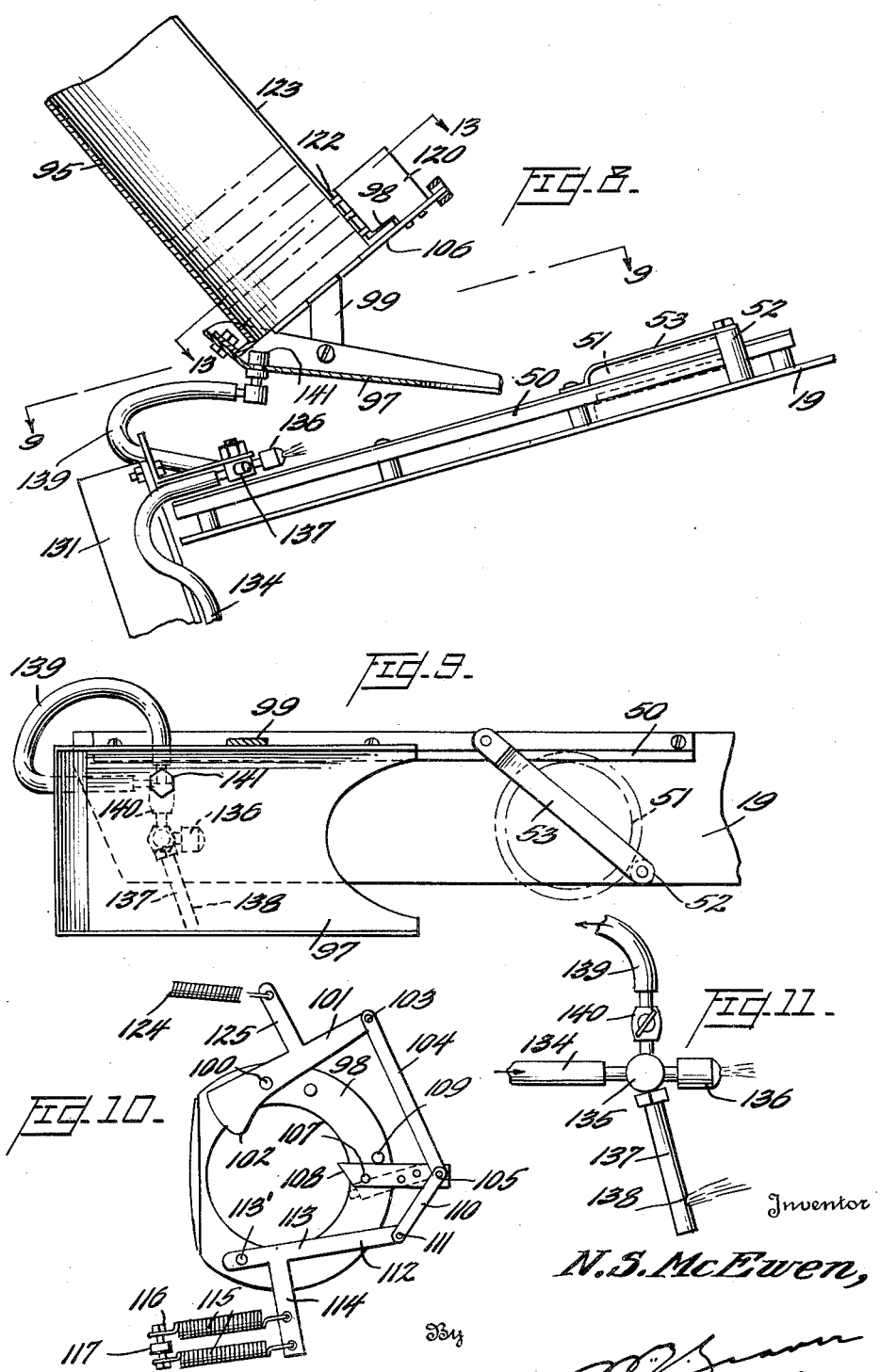

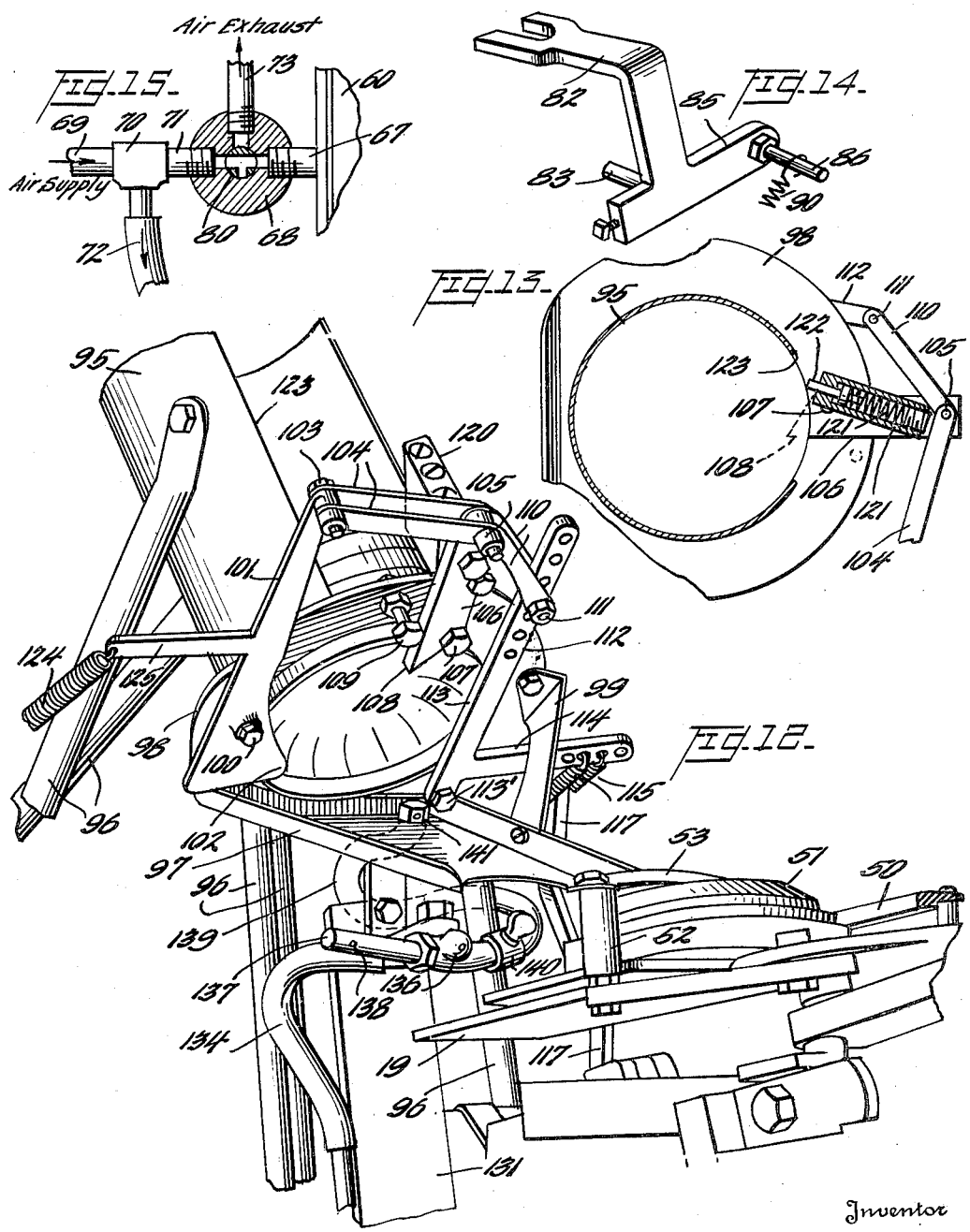

2,504,437

UNITED STATES PATENT OFFICE 2,504,437

SKEET TRAP

Norman S. McEwen, Fort Lauderdale, Fla.

Application November 18, 1946, Serial No. 710,575

7 Claims. (Cl. 124—8)

This invention relates to skeet traps and has for its object to provide an improved trap which is automatically and pneumatically operated and which is therefore safer than those heretofore proposed.

With these and other objects in view the invention resides in the novel details of construction and combinations of parts as will be disclosed more fully hereinafter and particularly covered by the claims.

Referring to the accompanying drawings forming a part of this specification and in which like numerals designate like parts in all the views:

Fig. 1 is an elevational view of one side of a skeet trap to which this invention is applied;

Fig. 2 is an elevational view of the opposite side of the trap illustrated in Fig. 1;

Fig. 3 is a horizontal view taken substantially on the line 3—3 of Fig. 2 and looking in the direction of the arrows;

Fig. 4 is a horizontal sectional view taken as on the line 4—4 of Fig. 2 and looking in the direction of the arrows;

Fig. 5 is an end elevational view of the main pneumatic control, said view being taken as on the line 5—5 of Fig. 4 and looking in the direction of the arrows;

Fig. 6 is a generally side elevational view of the pneumatic control illustrated in Fig. 5, with the main air cylinder shown partly in section to illustrate its interior construction;

Fig. 7 is a horizontal sectional view taken as on the line 7—7 of Fig. 5 and looking in the direction of the arrows;

Fig. 8 is a view partly in section and partly in side elevation, illustrating the association of the magazine for the "birds" or targets and the throwing arm, as well as the pneumatic means for insuring delivery of a "bird" to its proper position upon said throwing arm;

Fig. 9 is a view taken as on the line 9—9 of Fig. 8 and looking in the direction of the arrows;

Fig. 10 is a bottom plan view of the magazine and illustrates the means for releasing the bottommost "bird" from said magazine;

Fig. 11 is a detail view in plan illustrating the air nozzles employed in association with the throwing arm;

Fig. 12 is a perspective view illustrating the association of the magazine and throwing arm as well as the air nozzles cooperating therewith;

Fig. 13 is a view partly in section and partly in elevation, taken as on the line 13—13 of Fig. 8, and illustrating the mechanism employed for retaining the upper "birds" in the magazine while the bottommost "bird" is being released therefrom;

Fig. 14 is a perspective view of the member employed for actuating the main air control valve;

Fig. 15 is a detail view partly in section and partly in elevation showing the internal construction of the main air control valve;

Fig. 16 is a more or less diagrammatic illustration of the pneumatic system;

Fig. 17 is a detail view illustrating the connection of the piston rod of the main air cylinder with the main spring tensioning lever of the trap;

Fig. 18 is a detail view illustrating the latch for holding the main spring under tension;

Fig. 19 is a horizontal sectional view illustrating the release for the holding latch of the tensioned throwing arm; and Fig. 20 is an enlarged side elevational view to illustrate in better detail the mechanism for releasing the latching bar which holds the main spring under tension;

Fig. 21 is a sectional view taken as on the line 21—21 of Fig. 20 and looking in the direction of the arrows;

Fig. 22 is an enlarged horizontal view, partly in section, to illustrate in better detail a portion of the mechanism for operating the trigger bar; and Fig. 23 is a side elevational view of the parts shown in Fig. 22.

In heretofore known skeet traps the construction comprised in general a pivoted throwing arm upon which a frangible clay "bird" or target was manually placed, a main spring of considerable power which was placed under tension by the manipulation of a hand lever, the tension of said spring being transmitted to said throwing arm in its latched position, and a release mechanism which when actuated would unlatch the tensioned throwing arm and thus permit said throwing arm to oscillate about its pivot at relatively great velocity thus causing the "bird" thereon to be projected, under the action of centrifugal force, from the end of said throwing arm up into the air as a target to be shot at. Because manual operation was necessary, considerable care had to be exercised to prevent bodily injury to the trap attendant who might otherwise be struck by the tensioning lever and/or the released throwing arm.

Hence this invention is directed to an improvement in the construction of such a skeet trap, by which the operation of the trap, including the loading of the throwing arm with a "bird,"

is pneumatically controlled from any desirable point either adjacent to or remote from the trap, but in any event from such a point that any attendant would not have to be in such close proximity to the trap as to become injured by its actuation, and further the pneumatic control is automatically actuated by the operation of the moving parts of the trap with of course the exception of the release of the latched and tensioned throwing arm, which release as in heretofore proposed traps can be, and usually is, actuated from a remote point. As a result of this improvement, substantially the only necessity for an attendant is to the load the magazine with "birds". There are several different types of skeet traps now known and in use, but each type has the above mentioned principal or general operating elements, wherefore this invention can be applied to existing skeet traps with little or no modification required; however in the drawings and the following description, this invention is disclosed in connection with the "Wonder Trap" as manufactured and sold by Remington Arms Company Inc.

In order that the invention may be properly understood, a general description and operation of the existing trap is deemed necessary. A base 2 is provided which is firmly secured to any suitable support such as a bench, said base having an upstanding web 3 to which is pivoted as at 4 the frame (generally identified by the numeral 5) of the trap, said frame disposed in a generally vertical plane and tiltable about said pivot to increase or diminish the elevation of trajectory given to the "bird" by the throwing arm, said variation in elevation being made possible by the pin 6 carried by said frame and operable in the slot 7 of said web.

Said base carries a horizontal rock shaft 8 on one end of which is mounted the hand lever 9 for placing the main spring under tension, the other end of said rock shaft provided with a crank 10 whose free end is connected to one end of a link 11, the other end of the said link being pivotally connected as at 12 (see Fig. 4) to an arm 13 pivotally mounted as at 14 to the frame, which arm 13 when actuated, in turn abuts and causes actuation of a second and shorter superposed arm 15 mounted on the same pivot 14 (see Fig. 17). The free end of this superposed arm 15 has attached thereto one end of the heavy duty main spring 16, the other end of said spring being secured to a cam arm 17 carried by a vertically disposed sleeve 18 at whose upper extremity is mounted one end of the throwing arm 19.

The short superposed arm 15, near its pivot 14, carries one end of a bar 25 the other end of which (see Fig. 18) projects through an opening in a bracket 26 on the frame 5, and is provided with a shoulder or detent 27 which is adapted to snap into engagement with a squared edge 28 of said bracket under the urge of the spring 29, when the bar 25 is moved to the right as seen in said figure. This detent engagement takes place at substantially the end of the throw of arm 15 and at the time when the main spring has received its full tension, such engagement retaining said spring under its increased tension until said bar 25 is moved downwardly to break said detent engagement. The breaking of said engagement is accomplished by rotation of cam 17 carried by sleeve 18 of the throwing arm 19, which cam strikes and oscillates the downturned end 30 of a crank 31 mounted transversely of frame 5 the opposite end of said crank carrying a cam or pin 32 which strikes the upper surface of the bar 25 and, in the continued rotary movement of said crank, exerts a downward force upon said bar sufficient to disengage the detent 27 thereof from the latching edge 28 of the bracket 26; when thus disengaged, the short arm 15 is free to move to the right as seen in Fig. 4 and release the tension of main spring 16.

Thus it will be understood that cam 17 is rigidly carried by sleeve 18 of the throwing arm 19, and that said arm is latched against any rotation while the main spring 16 is being tensioned. In this arrangement of parts the depending end 30 of crank 31 extends into the ultimate path of movement of said cam so that when the throwing arm is released it will cause rotary movement of said cam counterclockwise as seen in Fig. 4, whereupon its free end will strike and ride under the end of crank end 30 and cause the crank to be moved correspondingly counterclockwise to raise the pin 32 thereof upwardly out of contact with the upper surface of bar 25, in this upward movement placing the small spring 33 under tension. After the cam 17 thus passes crank end 30, said crank end is free to move reversely under the tension of said spring 33, and again bring the pin 32 back into contact with the upper surface of the bar 25.

Upon the rebound or reverse swing of the throwing arm 19, said cam 17 will be reversely moved and again pass under end 30 but in this reverse movement the crank 31 will cause its pin 32 to move downwardly against the bar 25 a sufficient amount to depress said bar and to move its shoulder 27 out of holding engagement with the squared edge 28 of bracket 26, thereby allowing said bar to move to the right as seen in Fig. 4 under the urge of main spring 16. After cam 17 in its reverse movement has passed from under crank end 30, then said end 30 will automatically move to its normal position under the urge of gravity and/or the small spring 33, to reset said crank for a repeated operation by said cam 17.

A trigger bar 35 operating in a vertical plane is carried by the frame 5 and has a slight pivotal movement, being urged upwardly by a spring 36 carried by a bracket on said frame, and when thus urged upwardly, the trigger bar constitutes a latch for holding the throwing arm 19 in its fully tensioned position, but when said bar is given downward movement then it unlatches or releases the throwing arm. One end of the bar is adapted to rest on the upper surface of a horizontally disposed slide 37 passing through and supported by the frame 5, said bar resting upon the protruding end 43 of said slide, but when the slide is given reciprocal movement its end 43 is withdrawn from under said bar thereby permitting said bar to be moved downwardly to release the throwing arm, and said bar is maintained in its downward position until the throwing arm reaches substantially the limit of its rebound or reverse swing, when said bar is released and, under the urge of its spring 36, moves upwardly to again latch the throwing arm, but the throwing arm when thus again latched is not immediately placed under the tension of the main spring 16.

Integral with the throwing arm, is its downwardly extending sleeve 18 which has a laterally directed arm 190 with a downwardly extending pin 191 at its free end, which pin is positioned for entry into and out of a notch 192 formed in the periphery of a dog 193 pivotally mounted as at 194 to the upper surface of the frame 5. Said pivot 194 separates said notch 192 from another and larger peripheral notch 195, and said dog has an outwardly extending peripheral lug 196 disposed intermediate said notches and having overlapping relation with said trigger bar 35. Said lug 196 has a perpendicular shoulder 197 which is adapted only to contact a cam surface 198 formed on the trigger bar 35 when the throwing arm 19 is in its normal or set position.

When the slide 37 is moved to withdraw its end 43 from under the trigger bar 35, the throwing arm 19 being under tension will move with its integral sleeve arm 190 counterclockwise as seen in Fig. 21. In this movement the pin 191 will give rotary motion to the dog 193 in a clockwise direction causing the dog shoulder 197 to press against the cam shoulder 198 of trigger bar 35 to depress said bar about its pivot 199. When the upper face of the rear portion of said trigger bar is in the plane of the under surface of the dog 193, a continued rotary movement of the dog will permit the lug 196 to ride over the upper surface of said rear portion of the trigger bar and thereby hold said bar in its depressed position, the rotary movement of said dog 193 being limited in its opposite throws by the stationary frame-carried stop pin 200 engaging the ends of the peripheral notch 195.

In the rebound or reverse movement of the throwing arm, its pin 191 will again engage the notch 192 of said dog and cause it to move in a counterclockwise direction (see Fig. 21) until the dog shoulder 197 clears the cam shoulder 198 of the trigger bar 35, at which time the spring 36 will raise said bar to permit outward extension of slide 37 to position its end 43 under said bar and thus lock the throwing arm by virtue of the pin 191, notch 192, lug 196 and cam shoulder 198.

The slide 37 is actuated as follows. A bell crank is pivotally mounted as at 38 to the frame 5, one arm of said bell crank having secured thereto a pull wire 39 operable from a relatively remote point such as the firing line, and the other arm of said bell crank engages one end of a rod 40 reciprocably mounted on the frame 5 so that, when the pull wire 39 is actuated, said rod 40 will be moved to the right as seen in Fig. 1, the other end of said rod pivotally swinging the bar 41 to cause it to enter a cam notch 42 formed in the slide 37, said bar operating upon the surface of said cam notch to shift said slide (upwardly as seen in Fig. 19) and thus move the projecting end 43 of said slide from under the latch 35. Spring 44 returns the rod 40 and bar 41 to the left as seen in Fig. 1, thereby disengaging said bar from the cam notch. A spring not illustrated returns the slide 37 to its normal projecting position with respect to the latch 35 when the latter is raised by the rebound swing of the throwing arm.

The throwing arm 19 is mounted at one end on the sleeve 18 and is adapted to swing about the axis of said sleeve, said throwing arm comprising a base plate having rigidly mounted along one longitudinal edge thereof, in spaced relation to said plate, a resilient rail or cushion 50, preferably made of soft rubber, along which the circular "bird" 51 will slide or roll when centrifugally expelled from and during the swing of the throwing arm, due to the fact that said "bird" is made of easily frangible material. A resilient post or abutment 52 is mounted on said plate adjacent the opposite edge thereof and at a distance from the rubber rail 50 which is less than the diameter of said "bird", said abutment being relatively adjacent the inner end of the throwing arm, whereby the "bird" may be positioned as indicated in Fig. 9 before the throwing arm starts its swing, and during said swing the "bird" will slide over the surface and be expelled from the outer end of the swinging arm. If desired a bridge-like member 53 may be provided from the top of the abutment post 52 to the top of said rail at such angularity as illustrated in Fig. 9 to overlie substantially a diameter of the "bird" when the latter is positioned against said abutment, the purpose of this bridge being to prevent any accidental upward heave or misplacement of the "bird".

The swing of the tensioned throwing arm comprises approximately 270° to discharge the "bird," and then the inertia of the untensioned main spring and the operating mechanism of the throwing arm cause a reverse swing or rebound of the throwing arm of sufficient velocity to return the throwing arm to a position where it may again be latched by latch 35. The operating handle 9 is actuated through substantially 90° to place the main spring 16 under its full intended tension, the bar 25 then becoming operative to maintain said tension until such time as the pull wire 39 is actuated to unlatch the throwing arm, the tension of said main spring then being free to swing said throwing arm. However, it has required remanipulation of the operating handle 9 to again tension the main spring after the reverse swing and re-latching of the throwing arm, thereby again setting the trap for the next throwing of a "bird" by another manipulation of the pull wire 39; and with each resetting of the trap it has been necessary to manually position a "bird" on the throwing arm.

With the foregoing description of the operating parts of the heretofore known skeet trap, the following description will be directed to the improvements constituting this invention. To the end of the frame 5 adjacent the pivotal mounting of the throwing arm 19, there is rigidly secured an air cylinder generally identified by the numeral 60 and comprising a casing having an axial extension 61 serving as a bearing and housing respectively for the piston 62 and spring 63, one end of said piston carrying a piston head 64. One face of the air cylinder 60 is made open to receive the piston and piston head, but is closed by a heavy rubber diaphragm 65 and cover plate 66 bolted to said casing, said cover plate provided centrally thereof with an opening receiving an air conduit 67 leading to the main air valve 68.

Any suitable main air valve may be used, though a three-way valve is preferred and such as illustrated in Fig. 15. That is to say, compressed air (of approximately 100 lbs. pressure to the square inch) is led from a suitable source through a conduit 69 to a T 70 and from said T through a conduit 71 to a straight-through passage in valve 68 communicating with conduit 67 to the air cylinder 60, a branch conduit 72 leading from said T for a purpose to be described later. Another passage, at substantial right angles to the straight-through passage of said valve, communicates with a conduit 73 constituting an exhaust for the air cylinder. The stem of said valve is formed with passages of general T-shape as illustrated so that when said stem is in the position shown in Fig. 15, air will be admitted to the air cylinder through conduit 67, with the exhaust cut off through the valve, but when said stem is given 90° rotation, in a counter-clockwise direction, the exhaust conduit will be in communicatition with the cylinder, and air from the source will be cut off.

The piston rod 62 is extended and has its far end rigidly connected to the arm 13 (see Fig. 4) which is linked with the rock shaft 8, though it is to be understood that, when this invention is applied to an existing skeet trap, the hand lever 9 will be removed from said rock shaft. It thus results that when air is admitted to the air cylinder 60, the pressure of the air will operate upon the rubber diaphragm 65 and through it upon the piston head of the cylinder and move the piston rod 62 to actuate arm 13 and, through said arm, actuate the shorter superposed arm 15 to fully tension the main spring 16, the depth of the casing of the air cylinder being made sufficient to provide the necessary longitudinal movement of the piston 62 for accomplishing this result.

The means for cutting off the air supply to said cylinder 60 is particularly illustrated in Figs. 1, 3, 4, 5, 6, 14 and 16. The stem 80 of the main air valve is disposed substantially horizontally and parallel to the cover plate 66 of the cylinder, and extends entirely through said valve, one protruding end having rigidly secured thereto a radially extending pin or arm 81, the extremity of which is engaged by the forked end of a bell crank 82 pivotally mounted as at 83 to a plate 84 bolted to said cover plate and extending substantially at right angles thereto, so that when said bell crank is oscillated about its pivot the valve stem will be turned through approximately 90° by virtue of the forked connection with pin 81. Said bell crank has a laterally directed arm 85 (see Fig. 14) to the extremity of which is secured a pin 86 the axis of which is substantially parallel with the forked arm of the bell crank as well as with the valve stem, and this pin 86 is engaged by a fork 87 rigidly secured to one end of a push rod 88 the opposite end of which is rigidly secured to a bracket 89 rigid with the superposed arm 15 associated with the main spring 16, said bracket 89 disposed on the opposite side of the arm pivot 14 from said spring.

Thus it will be seen that when the superposed arm 15 is oscillated by the applied air pressure through piston 62, the main spring 16 will be tensioned with concurrent axial movement of the push rod 88, and the parts are so dimensioned and assembled that said push rod will actuate the bell crank 82 to rotate the valve stem 80 and cut off the main air supply to the cylinder 60 at the time when said main spring has become fully tensioned and latched by the functioning of latch rod 25. This operation of air cut-off gives the valve stem a quarter turn in a counter-clockwise direction as seen in Fig. 15 to close the valve against air admission from the air source and to bring into registry conduit 67 of the air cylinder and the exhaust conduit 73, whereby the air pressure in the cylinder is released to the atmosphere and the piston spring 63 becomes operative to move the piston to the left as seen in Figs. 1, 6 and 7 during the untensioning of the main spring 16 subsequent to the release of the throwing arm.

This last mentioned movement of the piston 62 is aided by the reverse oscillation of the superposed arm 15 and its underlying arm 13, for when the bar 25 is unlatched, the force of the tensioned main spring 16 is released, and this released force gives reverse oscillation to said arms, and hence the push rod 88 will be given concurrent reverse axial movement to in turn reversely operate the bell crank 82 and the valve stem 80, thereby rotating said valve stem clockwise as seen in Fig. 15 and again admitting air from its source of supply to the cylinder 60, and repeating the first mentioned movement of the piston rod 62 to the right for again tensioning the main spring 16 and latching it. As previously described, the unlatching of bar 25 and the release of the force of the tensioned spring 16 is accomplished by actuation of the pull wire 39. The light duty coil spring 90 is provided to insure seating of the pin 86 in the fork 87.

The opposite end of the main valve stem 80 may also protrude beyond the main valve 68, to have secured thereto and extending radially therefrom a pin 91 with a lateral extension 92 receiving one end of a coil spring 93 the other end of which is secured to a bracket 94 carried by the main valve housing, the mounting of said spring being such as to hold the valve stem 80 in either of the limits of its 90° throw, this being accomplished by the swing of said spring to either side of the center or axis of said valve stem, as will be readily understood (see Figs. 2 and 5). The purpose of this construction is to supplement the action of the spring 90 on the other side of the main valve, but it is to be understood that the parts 91 to 94 inclusive may be omitted if desired, particularly if and when the spring 90 is sufficient for holding the valve stem 80 in the positions to which it is moved.

A magazine 95 is provided to hold a supply of stacked "birds," said magazine comprising a circular tube the axis of which may be inclined to the plane of the throwing arm 19, and is supported in any convenient manner as by the legs 96 from the bench upon which the trap is mounted, the bottom of said magazine being open and disposed a short distance above said throwing arm. A chute 97 may be connected to the bottom of the magazine, the plane of said chute being inclined to both the magazine and the throwing arm so as to receive the bottommost "bird" when released from the magazine and to permit the received "bird" to slide from the chute onto said throwing arm. The means for releasing the bottommost "bird" is best illustrated in Figs. 1, 2, 8, 10, 12 and 13 and will now be described.

A collar 98 is provided at the bottom of the magazine and to which the chute 97 may be secured, rigidity of the chute being assured by a bracket 99 between the two. To the underside of said collar is pivoted as at 100 an arm 101 having at one end thereof a tongue 102 adapted normally to extend under the bottommost "bird" and to prevent it from dropping from the magazine.

The opposite end of said arm 101 is extended and has a pivotal connection at 103 with one end of a link 104, the opposite end of said link having a pivotal connection as at 105 with the outer end of a second arm 106 pivotally supported as at 107 to the underside of said collar 98, the inner end of said arm 106 having a toe 108 extending normally under the bottommost "bird" in the magazine also to prevent it from dropping out of the magazine, a stop pin 109 carried by said collar serving to limit the movement of the arm 106 in one direction.

To the pivot 105 is connected one end of another link 110 the opposite end of which is pivotally secured as at 111 to a third arm 112 pivotally secured as at 113' to the bottom surface of said collar 98 in such manner that a portion 113 of its edge normally underlies the bottommost "bird" in the magazine also for the same purpose, and said arm 112 has a lateral extension 114 to which ends of coil springs 115 may be secured, the opposite ends of said springs being connected as at 116 to the upper end of a lever 117 centrally mounted on the pivot 38 of the bell crank operated by the pull wire 39, said lever being extended downwardly and having its lower end connected as by the link 118 to the bracket 89 of the superposed arm 15.

Thus it will be seen that when the push rod 88 moves to the right as seen in Figs. 3 and 4 to cut off air to the cylinder 60, the link 118 will be moved correspondingly, and this results in a clockwise rotation as seen in Fig. 1 of the lever 117 and, through the springs 115, causes a clockwise rotation (as seen in Fig. 10) of the pivoted arm 112, which movement is concurrently transmitted to the arms 101 and 106 through their interconnecting links, to cause the tongue 102, the toe 108, and the edge portion 113, respectively, to be moved outwardly into positions which will permit the release of the bottommost "bird" from the magazine so that it will fall upon the chute 97. The "birds" in the magazine above said bottommost one are retained in the magazine at this time by a device now to be described.

The arm 106 has secured to its upper surface a casing 120 provided with a plurality of superposed bores or chambers each adapted to contain a coil spring such as 121 (see Fig. 13) to urge forwardly a plunger which extends a slight distance out of said casing and which is adapted to have its outer end contact the peripheral surfaces of the lowermost "birds" in the magazine above the bottommost "bird."

This casing 120 is obliquely mounted on the arm 106 so that normally the protruding plungers such as 122 will not be in contact with the edge surfaces of the "birds," but when said arm is oscillated to remove its toe 108 from under the bottommost "bird" in the magazine, the casing will bodily move with said arm to bring the protruding plungers into contact with said "birds," the springs such as 121 yielding but nevertheless exerting sufficient pressure on the plungers to transmit the force of said springs through the plungers onto the "birds" and wedge them against the diametrically opposite inner surface of the magazine, this pressure being made sufficient to hold all of the superposed "birds" in the magazine when the bottommost "bird" is released. The side wall of the magazine is cut away as at 123 to provide an opening through which said plungers may operate, and this cut away section may be extended upward of the magazine in order to permit a "sight" indication at all times of the number of "birds" in the magazine.

Upon the reverse movement of push rod 88 (to the left as seen in Fig. 3), there will be transmitted a reverse or counter-clockwise movement (as seen in Fig. 1) to the lever 117, whereupon the three arms 101, 106 and 112 will be given reverse oscillation by virtue of the spring 124 connected to a lateral extension 125 of arm 101 (see Fig. 10) to return the tongue 102, the toe 108, and the side portion 113, respectively, of said arms to positions beneath the stack of "birds" retained in the magazine by the plungers 122, and in this movement the pressure of said plungers is removed by the reverse oscillation of arm 106, so that the released stack of "birds" will come to rest upon the repositioned tongue, toe and side portion, respectively, of said arms.

Pneumatic means are employed for positioning a "bird" correctly onto the throwing arm, and will now be described with particular reference to Figs. 2, 8, 9, 11, 12 and 16. The conduit 72 conveys compressed air from the T 70 to a normally closed valve 130 attached to a bracket 131 carried by the frame 5, said valve being in the vertical plane of the link 11 for actuating the arm 13 associated with the tensioning mechanism of the main spring 16, said valve having a spring tensioned stem 132 whose protruding end may be formed with a button-head adapted to be struck by the end of a plunger 133 slidably mounted upon a rod rigidly supported by and movable with the link 11, a coil spring as shown in Fig. 2 being interposed to permit yieldability of said plunger when it strikes the button-head of said valve stem.

Hence it will be seen, that in the tensioning of the main spring 16, the link 11 will move the plunger 133 to the left as seen in Fig. 2, and that substantially at the end of the tensioning operation said plunger will actuate the valve stem 132 to permit the air in conduit 72 to pass through the valve 130 into conduit 134 leading upwardly from said valve to an air distributing head 135 (see Fig. 16) mounted rigidly with respect to the bracket 131, said distributing head being located slightly above and substantially in the longitudinal center of the throwing arm 19 when said throwing arm is in its latched position (see Fig. 9).

A nozzle 136 communicates with said distributing head and is positioned to direct a blast of compressed air longitudinally of the throwing arm. A pipe 137 also communicates with said distributing head, extending angularly therefrom as indicated in Figs. 9 and 16, and is plugged at its outer extremity but provided with an orifice 138 in the side wall thereof, which orifice is located so as to direct a blast of compressed air angularly across the upper surface of the throwing arm, the function of the blasts of air from nozzle 136 and orifice 138 being to force a "bird" along the upper surface of the throwing arm to position the same as shown at 51 in Fig. 9 against the rubber rail 50 and the rubber post 52.

A conduit 139 leads from the distributing head 135 with a manually operable valve 140 interposed therein, said conduit terminating in a nozzle 141 secured to the upper surface of the chute 97 (see Figs. 9 and 12), the position and function of this nozzle being to direct a blast of compressed air against the peripheral surface of the bottommost "bird" when dropped upon said chute, to project the dropped "bird" off the chute and onto the upper surface of the latched throwing arm 19. Due to the downward pitch of said chute, a lesser force of air blast from nozzle 141 may be sufficient to project the "bird" therefrom, and hence the manual valve 140 may be adjusted to provide only the required air force.

Therefore it is to be understood that the dropped "bird" will be projected from the chute by the air blast from nozzle 141 onto the upper surface of the latched throwing arm, where the "bird" will then be propelled by the blasts from nozzle 136 and orifice 138 to its correct position as shown at 51 in Fig. 9 on the throwing arm, this taking place substantially at the end of the tensioning operation of the main spring 16 and prior to the manipulation of the pull wire 39 for releasing the tensioned and latched throwing arm. As soon as the tension on the main spring is released, link 11 will move reversely carrying with it the plunger 133 whereupon the spring-controlled stem 132 of valve 130 will be free to assume its normal position and thus close said valve to the passage of compressed air therethrough.

It may be found sufficient to employ only one or both of the air jets 136 and 138 for blowing the "bird" to its correct position upon the throwing arm, and in such case the conduit 139 and the upper jet 141 may be omitted, the manual pressure controlling valve 140 then being moved to a suitable position in either of the conduits 72 or 134.

It is obvious that those skilled in the art may vary the details of construction and arrangements of parts without departing from the spirit of this invention, wherefore it is desired not to be limited to the exact foregoing disclosure except as may be required by the claims.

What is claimed is:

1. In a skeet trap the combination of a pivoted target throwing arm; a spring and operating mechanism therefor for tensioning said arm, one end of said spring secured to said arm; latch means for retaining said arm under the applied tension of said spring; means for releasing the latched and tensioned throwing arm; and pneumatic means for tensioning said spring, said tensioning means comprising an air cylinder and a piston therefor, said piston directly connected to said spring operating mechanism, said air cylinder connected with an air pressure line valve controlling admission of air to said cylinder for actuating said piston, and linkage connecting said spring operating mechanism and said valve to close said valve against admission of air to said cylinder when said spring becomes tensioned.

2. In a skeet trap the combination of a pivoted target throwing arm; a spring and an oscillatable lever connected thereto for tensioning said arm, one end of said spring secured to said arm; latch means for retaining said arm under the applied tension of said spring; means for releasing the latched and tensioned throwing arm; and pneumatic means for tensioning said spring, said tensioning means comprising an air cylinder, a piston therefor and an air pressure line valve connected to said cylinder, said piston directly connected to said lever, said valve connected to said lever for actuation thereby to supply air under pressure to said cylinder for actuating said piston in one movement of said lever, and to permit exhaustion of the air previously admitted to said cylinder in the reverse movement of said lever.

3. In a skeet trap the combination of a pivoted throwing arm; a spring and an oscillatable lever connected thereto for tensioning said arm, one end of said spring secured to said arm; a magazine for holding a supply of targets for said arm; means governing the feed of a target one at a time from said magazine to said arm; pneumatic means for tensioning said spring and for operating the target feeding means, said pneumatic means comprising an air cylinder, a piston therefor and an air pressure line valve connected to said cylinder, said piston connected to said lever, said target feeding means connected to said lever, and said valve connected to said lever for actuation thereby to supply air under pressure to said cylinder for actuating said piston in the tensioning movement of said lever, and to permit exhaustion of the air previously admitted to said cylinder in the reverse movement of said lever, the target feeding means becoming effective during the tensioning movement of said lever; and means for releasing the tensioned arm with its fed target.

4. In a skeet trap the combination of a throwing arm pivotally supported at one end thereof; a spring and an oscillatable lever connected thereto for tensioning said arm, one end of said spring secured to said arm; a magazine for holding a supply of targets for said arm; means for releasing a target from said magazine onto said arm at a point spaced from its pivoted end for centrifugal propulsion therefrom when the tensioned arm is released; pneumatic means for tensoining said spring and for moving the released target along said arm toward the pivoted end of said arm whereby to position the target for maximum centrifugal propulsion, said pneumatic means comprising an air cylinder, a piston therefor and a pair of air pressure line valves, one of said valves connected to said cylinder for controlling the actuation of said piston, said lever connected to said piston, said target releasing means connected to said lever, and said lever connected to the said one of said valves for admitting air to said cylinder in the tensioning movement of said lever, the target releasing means becoming effective during the tensioning movement of said lever, the other of said valves being normally closed and in an air conduit terminating in a nozzle disposed to blow a jet of air against the released target for propelling said target along the arm toward the pivoted end thereof, said lever having means for opening said second valve at the end of its tensioning movement and for causing the closing of said valve when the tensioned arm is released; and means for releasing the tensioned arm with its fed target.

5. In a skeet trap the combination of a pivoted throwing arm; a spring and an oscillatable lever connected thereto for tensioning said arm, one end of said spring secured to said arm; a magazine for holding a supply of targets for said arm; means for releasing a target from said magazine onto said arm for centrifugal propulsion therefrom when the tensioned arm is released; pneumatic means for tensioning said spring and for moving the released target along said arm toward the pivoted end of said arm whereby to position the target for maximum centrifugal propulsion, said pneumatic means comprising a conduit containing a supply of air under pressure and two control valves in said conduit, means for operating each of said valves in response to the movement of said lever, one of said valves controlling the actuation of a piston directly connected to said lever, the other of said valves controlling a jet of air from a nozzle for blowing the released target along said arm to the pivoted end thereof, said lever connected to the target releasing means for actuation thereof during the tensioning movement of said lever; and means for releasing the tensioned arm with its fed target.

6. In a skeet trap provided with an oscillatable target throwing arm for successively receiving targets to be individually ultimately projected therefrom under applied spring tension, a spring for tensioning said arm for its target throwing action, and latch means for retaining the throwing arm under the applied tension of its spring, the combination of a pressure cylinder provided with a piston; an oscillatable lever having one portion connected to said spring and having another portion connected to an end of said piston and movable thereby in one direction for tensioning said spring and actuating the latch means at the end of the tensioning operation; a manually operable release for the latched and tensioned throwing arm; valve means provided with a stem for controlling the admission of a fluid under pressure from a fluid supply to said cylinder, and for controlling the exhaustion of fluid from said cylinder, said stem having an external operating member; and means operatively connecting said oscillatable lever and said valve stem operating member for causing said lever to be moved in its spring-tensioning direction by said piston while fluid is being admitted to said cylinder, and to be moved in the opposite direction by the action of the unlatched throwing arm which opposite directional movement cuts off the fluid supply to said cylinder and causes exhaustion from said cylinder of the fluid previously admitted thereto.

7. In a skeet trap provided with an oscillatable target throwing arm for successively receiving targets to be individually ultimately projected therefrom under applied spring tension, a spring for tensioning said arm for its target throwing action, and latch means for retaining the throwing arm under the applied tension of its spring, the combination of a pressure cylinder provided with a piston; valve means provided with a stem having an external operating member, said stem movable to one position for admitting a fluid under pressure from a fluid supply to said cylinder for actuating said piston, and movable to another position for cutting off the fluid supply and permitting exhaustion of the fluid from said cylinder upon the reverse stroke of said piston; an oscillatable lever connected to an end of said piston and to an end of the throwing arm spring, said lever movable by said piston in one direction for tensioning the spring and actuating the latch means at the end of the tensioning operation; a manually operable release for the latched and tensioned throwing arm; and means operatively connecting said oscillatable lever and said valve stem operating member for controlling the movement of said lever in accordance with the fluid admission to and the fluid exhaustion from said cylinder.

NORMAN S. McEWEN.

REFERENCES CITED

The following references are of record in the file of this patent:

UNITED STATES PATENTS

| Number | Name | Date |
| --- | --- | --- |
| 519,512 | Tichenor | May 8, 1894 |
| 554,990 | Davis | Feb. 18, 1896 |
| 592,221 | Wells et al. | Oct. 19, 1897 |
| 687,856 | Schmitt | Dec. 3, 1901 |
| 715,179 | Troutner | Dec. 2, 1902 |
| 1,366,577 | Mahern et al. | Jan. 25, 1921 |
| 2,267,525 | Kemp | Dec. 23, 1941 |
| 2,310,746 | Parker et al. | Feb. 9, 1943 |